US011952120B2

(12) United States Patent
Cameron-Donald et al.

(10) Patent No.: US 11,952,120 B2
(45) Date of Patent: Apr. 9, 2024

(54) MULTI-LAYER SLEEPING COMPARTMENT

(71) Applicant: AIR NEW ZEALAND LIMITED, Auckland (NZ)

(72) Inventors: Kate Elizabeth Cameron-Donald, Masterton (NZ); Zoe Marie-Josee Julia Wenn, Auckland (NZ)

(73) Assignee: AIR NEW ZEALAND LIMITED, Auckland (NZ)

( * ) Notice: Subject to any disclaimer, the term of this patent is extended or adjusted under 35 U.S.C. 154(b) by 74 days.

(21) Appl. No.: 17/904,486

(22) PCT Filed: Feb. 18, 2021

(86) PCT No.: PCT/IB2021/051356
§ 371 (c)(1),
(2) Date: Aug. 18, 2022

(87) PCT Pub. No.: WO2021/165858
PCT Pub. Date: Aug. 26, 2021

(65) Prior Publication Data
US 2023/0108912 A1 Apr. 6, 2023

(30) Foreign Application Priority Data
Feb. 20, 2020 (NZ) ........................ 761879

(51) Int. Cl.
*B64D 11/00* (2006.01)
(52) U.S. Cl.
CPC ...... *B64D 11/00* (2013.01); *B64D 2011/0069* (2013.01)

(58) Field of Classification Search
CPC ............ B64D 11/00; B64D 2011/0069; B64D 2011/0084
See application file for complete search history.

(56) References Cited

U.S. PATENT DOCUMENTS

| 4,589,612 A | 5/1986 | Halim |
| 5,784,836 A | 7/1998 | Ehrick |
| 6,152,400 A | 11/2000 | Sankrithi et al. |
| 6,155,519 A | 12/2000 | Rajasingham |
| 7,699,264 B2 | 4/2010 | Guering |

(Continued)

FOREIGN PATENT DOCUMENTS

| CN | 101234641 A | 8/2008 |
| CN | 105291924 A | 2/2016 |

(Continued)

OTHER PUBLICATIONS

Priestman Goode Internet Advertisement as viewed at https://www.priestmangoode.com/project/obb-austrian-federal-1railways/ on Dec. 7, 2021.

*Primary Examiner* — Valentina Xavier
(74) *Attorney, Agent, or Firm* — DANN, DORFMAN, HERRELL and SKILLMAN, P.C.

(57) ABSTRACT

A multi-layer sleeping compartment for an aircraft is provided in order to more comfortable accommodate passengers to recline and sleep. The multilayer compartment houses a plurality of sleeping pods arranged either side of an entrance, and the sleeping compartment is generally aligned with a longitudinal axis of the aircraft. Further the pods may be booked for session times during the normal flight of an aircraft.

20 Claims, 7 Drawing Sheets

(56) References Cited

U.S. PATENT DOCUMENTS

| | | | |
|---|---|---|---|
| 8,070,098 B2 | 12/2011 | Guering | |
| 8,162,258 B2 * | 4/2012 | Joannis | B64D 11/00 244/118.6 |
| 9,096,318 B2 | 8/2015 | Ergenci et al. | |
| 9,919,800 B2 * | 3/2018 | Cailleteau | B64D 11/06 |
| 9,994,318 B2 | 6/2018 | Roese et al. | |
| 10,909,397 B2 * | 2/2021 | Behr | H04N 7/181 |
| 11,312,494 B2 * | 4/2022 | O'Neill | B64D 11/0601 |
| 2008/0011901 A1 | 1/2008 | Guering | |
| 2008/0282467 A1 | 11/2008 | Edwards | |
| 2011/0114789 A1 | 5/2011 | Ergenci et al. | |
| 2014/0298582 A1 * | 10/2014 | Kircher | B63B 29/20 5/9.1 |
| 2016/0075432 A1 | 3/2016 | Wartena | |
| 2017/0057637 A1 * | 3/2017 | Cole | B64D 11/00 |
| 2017/0137109 A1 | 5/2017 | Sieben | |
| 2019/0031350 A1 | 1/2019 | Chen | |
| 2020/0062400 A1 | 2/2020 | Safran | |
| 2020/0070691 A1 * | 3/2020 | Glain | B60N 2/809 |
| 2020/0079508 A1 | 3/2020 | Safran | |

FOREIGN PATENT DOCUMENTS

| | | |
|---|---|---|
| CN | 107697305 A | 2/2018 |
| EP | 2371650 B1 | 10/2011 |
| EP | 2786934 B1 | 8/2014 |
| EP | 2848532 B1 | 3/2015 |
| WO | 2002028712 A1 | 4/2002 |
| WO | 2018211076 A1 | 11/2018 |

* cited by examiner

MULTI-LAYER SLEEPING COMPARTMENT

FIELD OF THE INVENTION

The present invention relates to a multi-layer sleeping compartment. More particularly, it relates to a multi-layer sleeping compartment for a passenger vehicle such as an aircraft.

BACKGROUND OF THE INVENTION

Typically, passenger aircraft have different travel classes such as First Class, Business Class, Premium Economy and Economy Class. Airlines offer these different services to cater to different passenger's needs and spending ability. Generally, First Class and Business Class are more expensive, and have more comfortable and spacious accommodation (including lie-flat sleeping options), as each seat can take up a bigger footprint in the cabin.

However, the density of passengers in Economy Class is generally higher (more passengers seated in each area). Economy passengers generally struggle to rest and/or have uninterrupted, sustained deep sleep on a flight (without sleeping pills or aids). After a long flight, this can leave passengers feeling exhausted at their destination.

To improve comfort, economy seats on aircraft may recline a little. However, these seats typically cannot recline anywhere near flat or horizontal as the seat may encroach into the space of passengers in the row behind. Barriers to comfort and/or sleep can be high in the economy region of an aircraft as passengers generally have to sit or sleep upright for a prolonged duration, they do not have enough space to stretch out (especially for tall passengers).

It may be desirable to provide accommodation for economy and/or premium economy passengers on an aircraft which improves comfort and/or reduces barriers to rest or sleep compared to a 'standard' economy seat. It may be desirable the accommodation for economy passengers can still fit a high density of passengers in an area of the cabin, to keep costs for each passenger relatively low and/or maintain or increase airline profits.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

It is an object of the present invention to provide a multi-layer sleeping compartment which overcomes or at least partially ameliorates some of the abovementioned disadvantages or which at least provides the public with a useful choice.

BRIEF DESCRIPTION OF THE INVENTION

According to a first aspect the invention broadly comprises a multi-layer sleeping compartment for an aircraft comprising:
  a housing;
  an entrance to the sleeping compartment;
  a plurality of sleeping pods, the sleeping pods are arranged into a first side of pods and a second side of pods, the plurality of sleeping pods located within the housing; and
  each side of sleeping pods has at least a top pod and a lower pod;
  wherein the sleeping compartment is generally aligned with an aircraft longitudinal axis of the aircraft; and
  wherein the sleeping compartment is located on or towards a centreline of the aircraft body.

According to another aspect each sleeping pod is elongate and has a pod longitudinal axis substantially parallel to the aircraft longitudinal axis of the aircraft.

According to another aspect the sleeping compartment is located along the centreline of the aircraft body.

According to another aspect the sleeping compartment is located between two aisles in the aircraft.

According to another aspect the entrance to the sleeping compartment is located at an end of the sleeping compartment.

According to another aspect the entrance provides access to a central lobby area located between the first side of pods and the second side of pods.

According to another aspect the central lobby area is approximately trapezoidal or triangular in plan view such that the width of the central lobby area is wider towards the entrance.

According to another aspect the sleeping pods narrow towards an entrance end of the sleeping pod such that the width of the sleeping pods are narrower towards the entrance to allow for a wider central lobby area.

According to another aspect the sleeping pods comprises a generally oblique side wall adjacent the central lobby area in plan view such that the side of the sleeping pod adjacent the central lobby area tapers away to allow for a wider central lobby area.

According to another aspect the sleeping pods narrow such that the oblique side wall is at an angle between 10° and 20° from the longitudinal axis of the sleeping compartment.

According to another aspect the central lobby area extends at least half-way into the sleeping compartment from the entrance.

According to another aspect the central lobby area provides side entry for the sleeping pods on an internal side of the sleeping compartment.

According to another aspect the side entry is at least 70 cm long.

According to another aspect the side entry is at least 100 cm long.

According to another aspect the sleeping compartment is positioned such that the entrance is at a cross aisle of the aircraft.

According to another aspect the entrance is between 50 and 100 cm wide.

According to another aspect the entrance is between 60 and 85 cm wide.

According to another aspect the invention further comprises a central vertical console located between the first side of pods and a second side of pods.

According to another aspect a shorter side of the trapezoid-shaped central lobby area is adjacent the central vertical console.

1. According to another aspect the central vertical console houses one or more services including one or a combination of:
  a) Air conditioning/air gaspers,
  b) Smoke detector,
  c) Electrical wiring,
  d) Ducting,
  e) Charging port,
  f) Lights, g) Illuminated signs,
h) Crew call button,
i) Oxygen mask modules,
j) Safety belt,
k) Life vests,
l) PSU (Passenger Service Unit),
m) IFE screen (In Flight Entertainment),
n) Headphone jack,
o) Bluetooth or other wireless audio connection,
p) Storage,
q) Speakers According to another aspect the central vertical console is located at or towards an end of the sleeping compartment opposite to the entrance.

According to another aspect the central vertical console at least partially forms a barrier or screen between the first and second side of pods.

According to another aspect one or more handles are integrated with the central vertical console.

According to another aspect the one or more handles are recessed into the central vertical console.

According to another aspect the invention further comprises steps located between the first side of pods and second side of pods for access to the upper sleeping pods.

According to another aspect the steps are located at or towards an end of the sleeping compartment opposite to the entrance.

According to another aspect wherein the steps are integrated with the central vertical console.

According to another aspect the invention further comprises a raised ceiling region raised into an aircraft ceiling to provide additional head space, the raised ceiling region being at least in an area above the steps.

According to another aspect the raised ceiling region is recessed between 10 to 35 cm up into the aircraft ceiling.

According to another aspect the raised ceiling region is recessed between 23 to 28 cm up into the aircraft ceiling.

According to another aspect each sleeping pod comprises a permanent flat bed surface.

According to another aspect one or both sides of sleeping pods have one or two intermediate sleeping pods between the upper sleeping pod and lower sleeping pod.

According to another aspect the sleeping compartment is between 120 and 160 cm wide.

According to another aspect the sleeping compartment is between 180 and 230 cm long.

According to another aspect the sleeping pod has a head region at an end of the sleeping compartment away from the entrance and a foot region towards the entrance.

According to another aspect the invention broadly comprises a method of travel on an aircraft wherein, a session in a multilayer sleeping compartment according to any one of the previous clauses is booked for at least 1 passenger.

According to another aspect the session is for a duration shorter than the entire flight.

According to another aspect the session is during a cruising flight time, said cruising flight time excluding taxi, take off and landing.

According to another aspect the session is for only part of a cruising flight time.

According to another aspect a cruising flight time is divided into multiple sessions.

According to another aspect said multiple sessions cannot be book by the same passenger.

According to another aspect said session is booked prior to take off.

According to another aspect said session is booked after take off.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification and claims means "consisting at least in part of". When interpreting statements in this specification and claims which include that term, the features, prefaced by that term in each statement, all need to be present but other features can also be present. Related terms such as "comprise" and "comprised" are to be interpreted in the same manner.

BRIEF DESCRIPTION OF THE DRAWINGS

The invention will now be described by way of example only and with reference to the drawings in which.

DETAILED DESCRIPTION OF PREFERRED EMBODIMENTS

According to various aspects of the present invention as illustrated in FIGS. 1-10, there is provided a multi-layer sleeping compartment 1. The multi-layer sleeping compartment 1 is configured to be used in a passenger vehicle, in particular in aircraft (commercial passenger aircraft as well as private or corporate aircraft).

It will be appreciated that these figures illustrate the general principles of the structure, layout and construction, and that the invention is not limited to the precise configurations illustrated.

Figure 1:
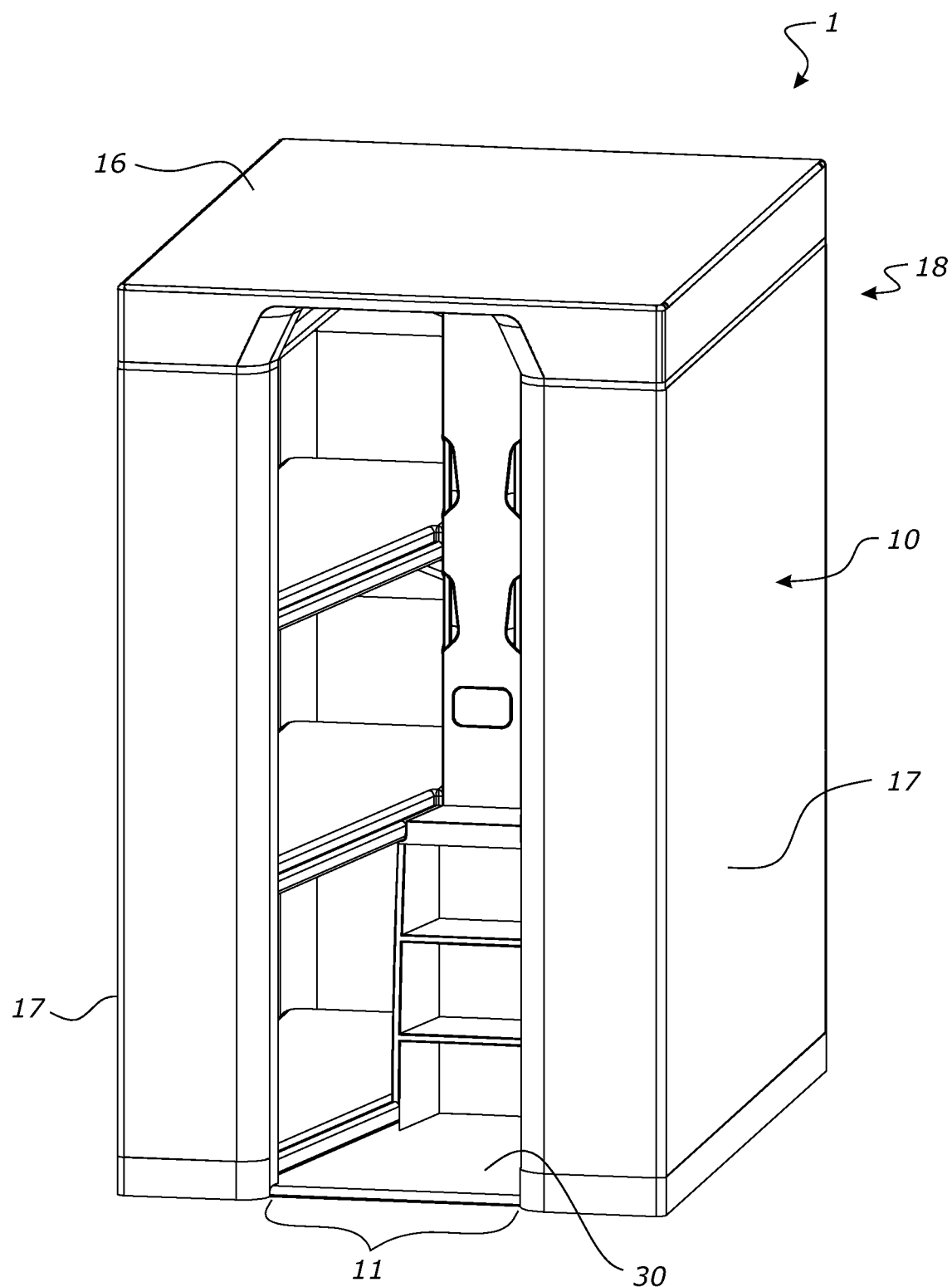
FIG. 1 shows a perspective view of a multi-layer sleeping compartment.
Figure 7:
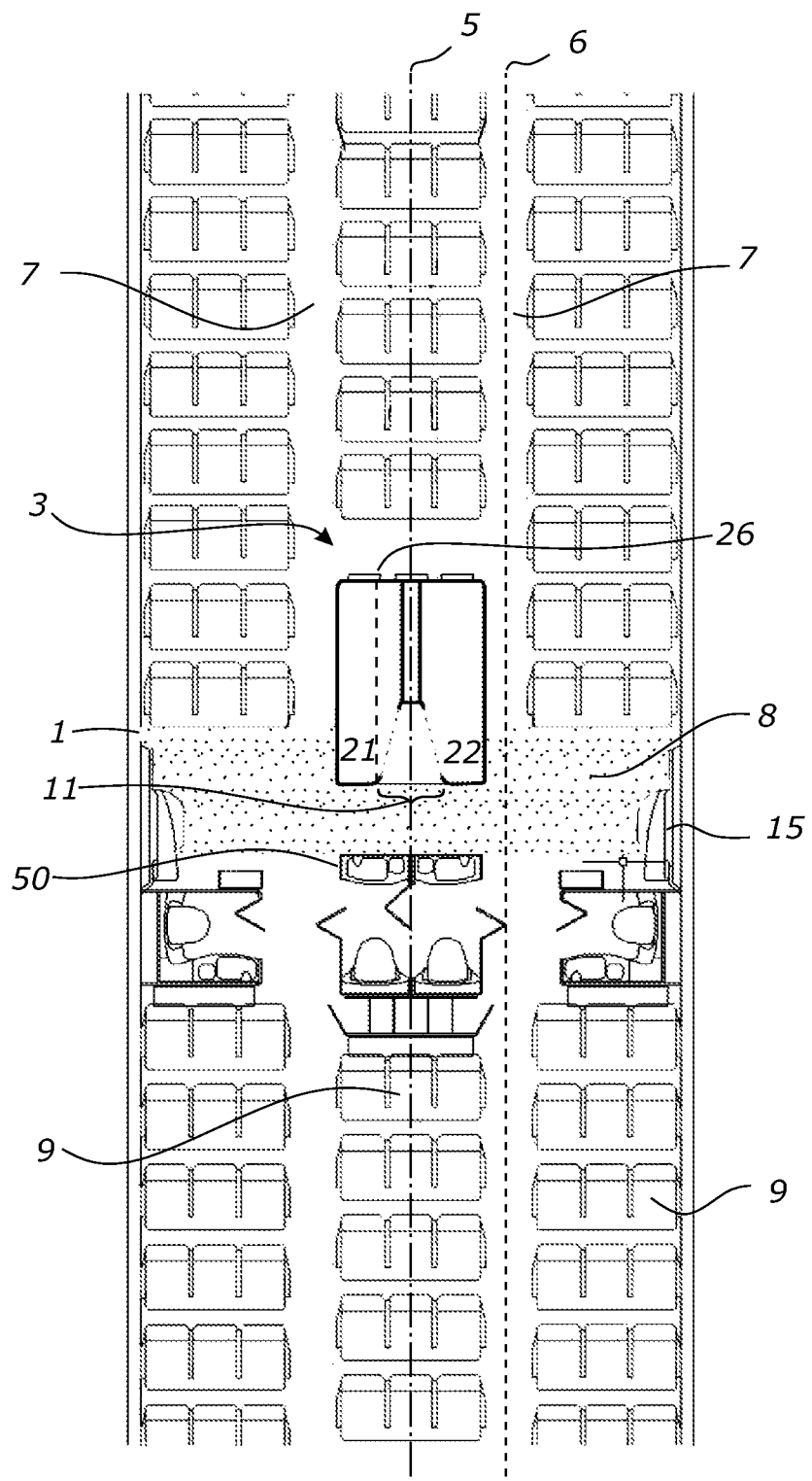
FIG. 7 shows a partial LOPA (layout of passenger accommodations).

With reference to FIG. 1, in the preferred configurations, the multi-layer sleeping compartment 1 comprises a housing 10 and an entrance 11 to the sleeping compartment 3. The housing 10 of the sleeping compartment 1 at least partially isolates or separates the sleeping compartment from the open cabin area 3 of the aircraft 2, as shown in FIG. 7.

The housing 10 of the sleeping compartment 1 preferably has at least sidewalls 17 and a back (or front) wall 18. In the preferred configurations, the compartment also has a top cover 16 and/or floor. The housing 10 isolates the sleeping pods 20 from the open cabin area 3 once assembled, however to fit the sleeping compartment 1 into the aircraft, the housing 10 (and other components of the compartment)

may need to be split into multiple parts to fit through the aircraft doors 15 and be installed on the aircraft.

Figure 10:
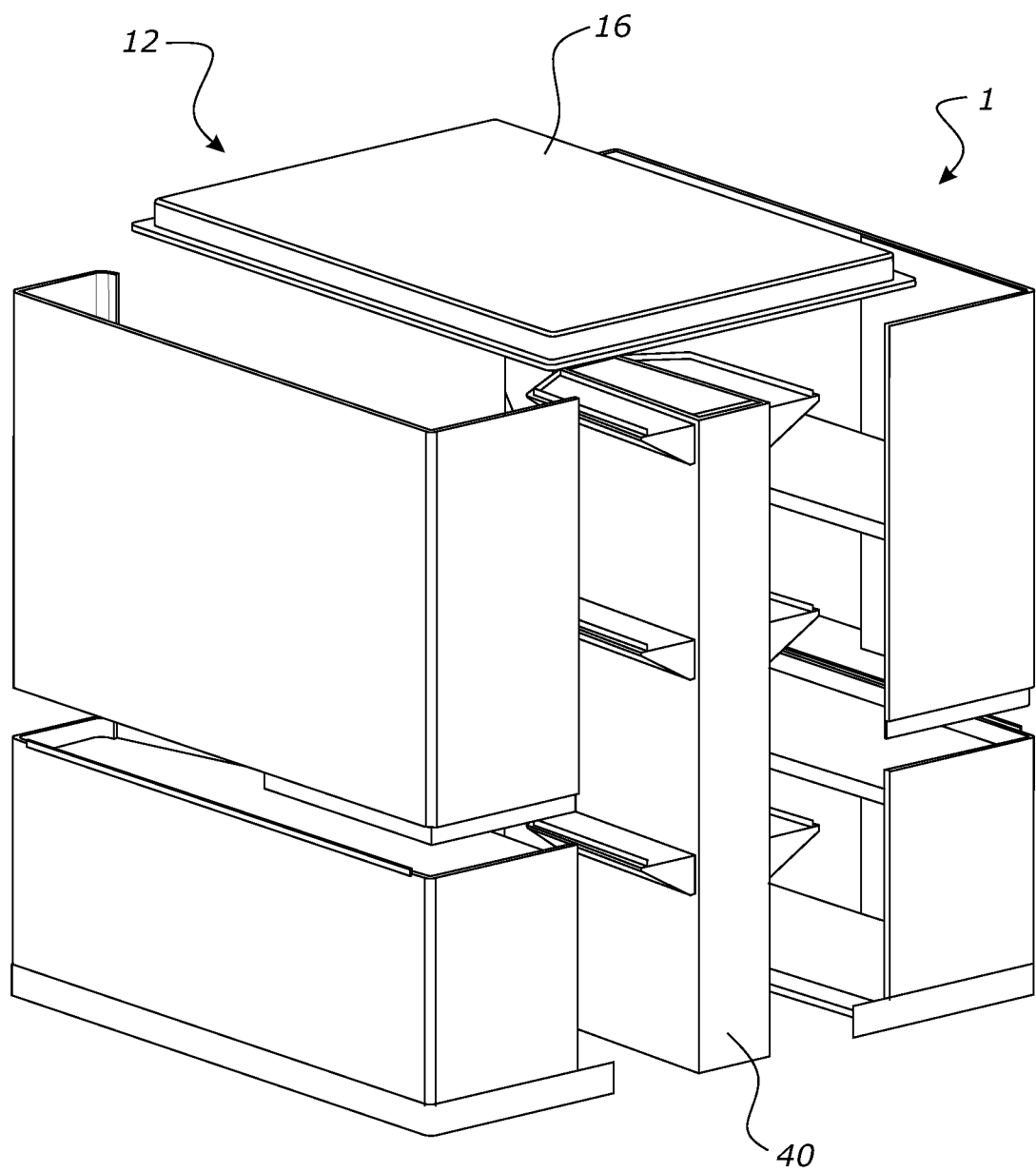
FIG. 10 shows an exploded view of the multi-layer sleeping compartment.

For example, the sleeping compartment 1 may be split into 6 or more parts to fit through the aircraft doors 15 as shown in FIG. 10. Preferably, the compartments are designed for simple fitment and assembly.

In the preferred configurations, the entrance 11 to the sleeping compartment 1 is located at an end 12 of the sleeping compartment. Most preferably, the entrance 11 is located at only one end 12 of the sleeping compartment to reduce noise, smell or other disturbance from the cabin area 3 from entering the compartment. In other configurations, the entrance 11 may be located at both ends 12, 13 of the sleeping compartment 1, e.g. for ease of access.

Figure 3:
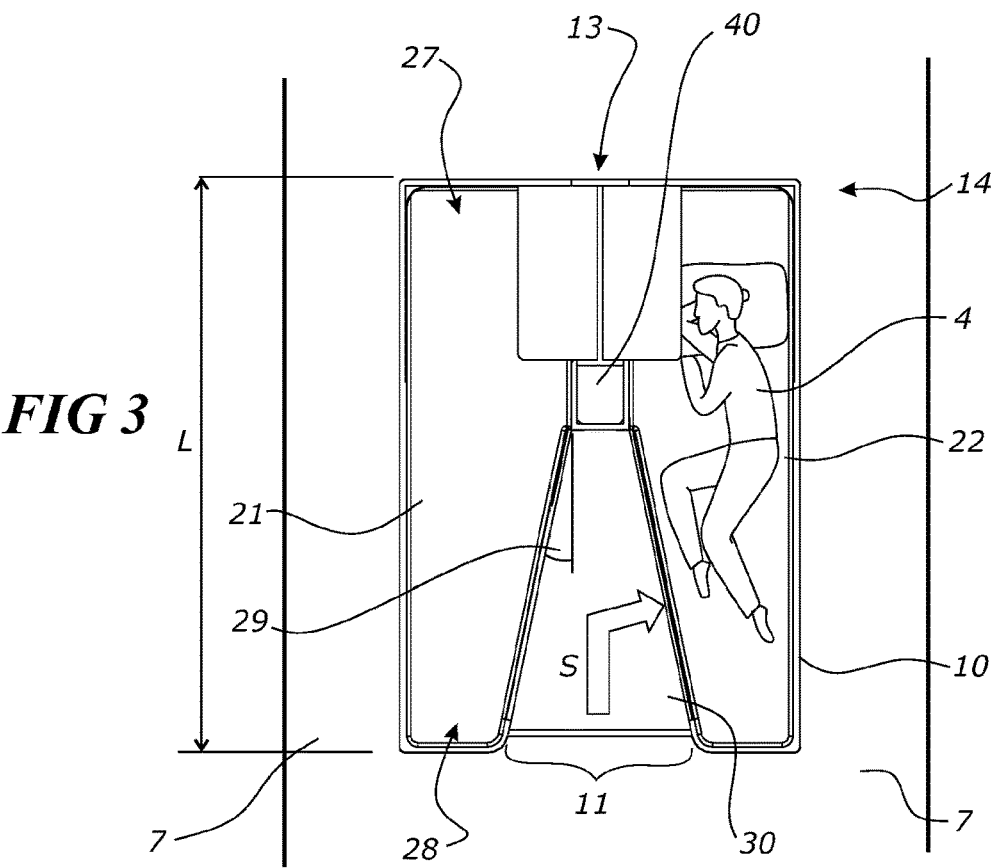
FIG. 3 shows a plan view of the multi-layer sleeping compartment.

In the preferred configurations, the entrance 11 is not located on a side 14 of the sleeping compartment (referenced in FIG. 3). The entrance 11 located at an end of the sleeping compartment 1 can be separate from the longitudinal aisles 7 of the aircraft which can provide advantages, as described in detail below.

Optionally, a curtain, sliding door or other screening may be installed at the entrance 11 improve the privacy and/or separation of the sleeping pod passengers from the other passengers and crew in the aircraft.

Preferably, the multi-layer sleeping compartment 1 is a stand-alone monument which can be installed onto an aircraft (or other passenger vehicle). In the preferred configurations, the sleeping compartment 1 comprises attachment points to connect the compartment to the aircraft ceiling.

Sleeping Pod Layout

The multi-layer sleeping compartment 1 comprises a plurality of sleeping pods 20. The plurality of sleeping pods 20 are located within the housing 10. The sleeping pods 20, are designed for passengers to rest during a flight, in particular during long flights (some of which can be as long as 18 hours). The sleeping compartment 1 could be used on short-haul, medium-haul, long-haul or ultra-long-haul journeys.

The sleeping pods 20 provide a space on the aircraft 2 for passengers 4 to lie down, sleep, rest or to simply escape from their seats during a flight to a more private space to lie down, thus improving experience on flights.

In the preferred configurations, each sleeping pod 20 comprises a permanent flat bed surface. Preferably, the sleeping pods 20 are flat having a level surface in a horizontal position or an approximately horizontal position on the aircraft. In some configurations, the bed surface is approximately horizontal/flat as the bed surface may have a slight angle (e.g. 3 degrees from horizontal) to cater for the flight angle of the aircraft in flight. As the bed surface has a slight angle, the passenger should feel completely flat when the aircraft is in flight. People typically sleep better on flat surfaces and the surface gives more space for passengers to stretch their legs out. Preferably, the sleeping pods are permanently fixed in the flat configuration i.e. the bed does not fold and unfold. A permanent bed structure may be more simple and less expensive to manufacture, be more stable, and would not require time to be set up (moved into position) for each passenger.

Preferably, a mattress or other soft surface is provided in each sleeping pod 20, on the flat bed surface. The mattress may include a comfortable resilient material such as foam, and possibly lined with more hardwearing material such as fabric or leather.

The multi-layer sleeping compartment 1 may be particularly suited to a wide-body aircraft. Typically, wide-body aircraft have two-aisles 7. A wide-body aircraft is typically more than 5 meters wide and has seven to ten seats abreast.

The sleeping compartment 1 may be installed on a range of aircraft, for example including, but not limited to a 787, 777, 747, 767, A340, A350, A380. It should be appreciated, the sleeping compartment 1 may be installed onto other existing and future aircraft models, or other vehicles for transport of passengers.

In the preferred configurations, the rows of seats 9 extending from the side of the aircraft, adjacent the sleeping compartment, do not need to be removed in a wide body aircraft. Preferably, the width of the sleeping compartment 1 is limited, such that only the seats in the middle section, between the longitudinal aisles 7 need to be removed.

It is anticipated the multi-layer sleeping compartment 1 may be installed on a narrow—body aircraft with no, or minor, modifications to the present invention. For example, the sleeping compartment 1 may be installed in a 737 or A320, which have a similar cabin height to wide body aircraft. The multi-layer sleeping compartment 1 may also be installed on a customised narrow body private/corporate or charter aircraft. In some configurations, one or more side seats may be removed to make room for the sleeping compartment 1.

Aircraft generally have limited cabin space for passengers. The multi-layer sleeping compartment 1 of the present invention may be particularly beneficial in the economy class of an aircraft. The density of passengers in the economy class of an aircraft is generally high (more passengers seated in each area), so that the costs for each passenger may be lower than other seats in an aircraft. The sleeping compartment 1 of the present invention can provide sleeping pods 20 with a limited footprint.

To provide sleeping pods 20 on a limited footprint in an aircraft, the layout, orientation and location of the sleeping compartment 1 are important considerations.

Preferably, the sleeping pods 20 are arranged into a first side of pods 21 and a second side of pods 22. Two sides of pods 21, 22 can fit efficiently in the centre region of traditional wide-body aircraft. The utilities, services, and/or entrance 11 may be positioned between the two sides of pods 21, 22, as described later.

It should be appreciated, having two sides of pods 21, 22 (rather than one side) may provide particular advantages. Two sides of pods 21, 22 efficiently uses space in the aircraft cabin to provide more sleeping pods 20 for a given compartment footprint. Providing more sleeping pods 20 for passengers can help cover costs of manufacture and/or installation of the sleeping compartment 1. Having two sides of pods 21, 22 also provides a central lobby area 30 (discussed in detail later) which uses space in the cabin efficiently to provide access into the sleeping pods 20 separate from the aisles 7.

In the preferred configurations, the first and second side of pods 21, 22 are mirrored (i.e. they are symmetrical along the longitudinal axis).

Preferably, each side of sleeping pods 21, 22 has at least a top pod 23 and a lower pod 25. The sleeping compartment 1 has a multi-layer compartment layout with two or more layers or bunks on each side. It should be appreciated, that a multi-layer sleeping compartment 1 can house a greater number of sleeping pods 20 for passengers to rest in, for a given compartment footprint. A multi-layer structure uses the vertical space in the aircraft cabin.

In some configurations, one or both sides 21, 22 of sleeping pods have one or two intermediate sleeping pods 24 between the upper sleeping pod 23 and lower sleeping pod 25 (i.e. 3 or 4 layers of sleeping pods). In the most preferred illustrated configuration of FIG. 2, the sleeping compartment 1 has three layers of sleeping pods 20 on each side 21, 22 (the upper sleeping pod 23, an intermediate sleeping pod 24, and a lower sleeping pod 25). Note, the right sidewall of the compartment is hidden in FIG. 2 to show the internal features of the compartment.

In the preferred configurations, the sleeping compartment 1 has two to three layers of sleeping pods to balance the desired to fit more passengers in the sleeping compartment 1 and the comfort of each passenger, in a restricted height of an aircraft.

Preferably, the sleeping pods 20 on each side 21, 22 are aligned in plan view (i.e. not arranged in a staggered configuration).

In some configurations, the vertical spacing between sleeping pods 20 are even.

In the preferred configurations, the vertical spacing between sleeping pods 20 are uneven, for improved access and/or to accommodate different passengers. For example, the lower sleeping pods 25 have a greater vertical spacing in comparison to the pods above, to improve access into the lower sleeping pods.

The number of layers of sleeping pods 20 in the sleeping compartment 1 is restricted by the vertical height of the aircraft. It is anticipated that the sleeping compartment 1 may have more layers of sleeping pods 20, provided the aircraft can accommodate the height of the sleeping compartment.

Central Lobby Area

In the preferred configurations, the multi-layer sleeping compartment 1 comprises a central lobby area 30. The entrance 11 of the sleeping compartment 1 provides access to the central lobby area 30. Preferably, the central lobby area 30 is located between the first side of pods 21, and second side of pods 22.

The central lobby area 30, provides a space for passengers to prepare and get into the sleeping pods 20. This area may also be used by crew to conduct safety checks on passengers during their session in the sleeping pods, or provide any assistance required. The central lobby area 30, is located within the multi-layer sleeping compartment 1, and is isolated from the aisles 7 of the aircraft. Having a separate central lobby area 30 in the sleeping compartment, can be beneficial as the passenger of a sleeping pod can take their time to get into the sleeping pod. In contrast, if the passenger needed to get into the sleeping pod 20 at the aisle 7 of the aircraft, they may feel rushed and could impact other passengers, crew or galley carts trying to pass, and/or the passenger would be getting into the pods at close proximity to passengers seated on the sides of the aircraft. A central lobby area 30 may reduce the embarrassment or disruption and allow for a more dignified, and comfortable entry into the sleeping pods 20.

The central lobby area 30 is preferably wide enough for an aircraft aisle chair (reduced width compared to a standard wheelchair) to enter, so that passengers with reduced mobility can use the sleeping pods 20. The aircraft aisle chair may have a special 'booster' to raise the passenger up to the same height of the intermediate level pod 24. This enables the passengers to slide into the sleeping pod 20, requiring limited strength, while remaining dignity.

Preferably, the central lobby area 30 provides side entry into the sleeping pods 30 on an internal side of the sleeping compartment 1, as shown by side entry arrow (S) in FIG. 3.

Most preferably, sleeping pod passengers enter/walk into the sleeping compartment 1 at the entrance 11, at an end of the sleeping pod, and enter/climb through a side of an individual sleeping pod 20, as shown by arrow (S) in FIG. 3.

Side entry into the sleeping pods 20 is more natural and comfortable for passengers in comparison to end access to sleeping pods. Preferably side entry (S) into the sleeping pods provides an entrance experience similar to a traditional bed or bunk to enable passengers to access each pod from the side.

Furthermore, side entry may allow passengers to get out of the sleeping pods 20 easier and quicker which is particularly important in an emergency.

In comparison, end access to sleeping pods may be an undesirable experience, as it can be uncomfortable or difficult (especially for passengers with limited mobility) to crawl in and out of an end of an elongate sleeping pod.

In the preferred configurations, the side entry (S) is at least 70 cm long (i.e. the space open for side entry is at least 80 cm long). More preferably, the side entry is at least 100 cm long.

Figure 2:
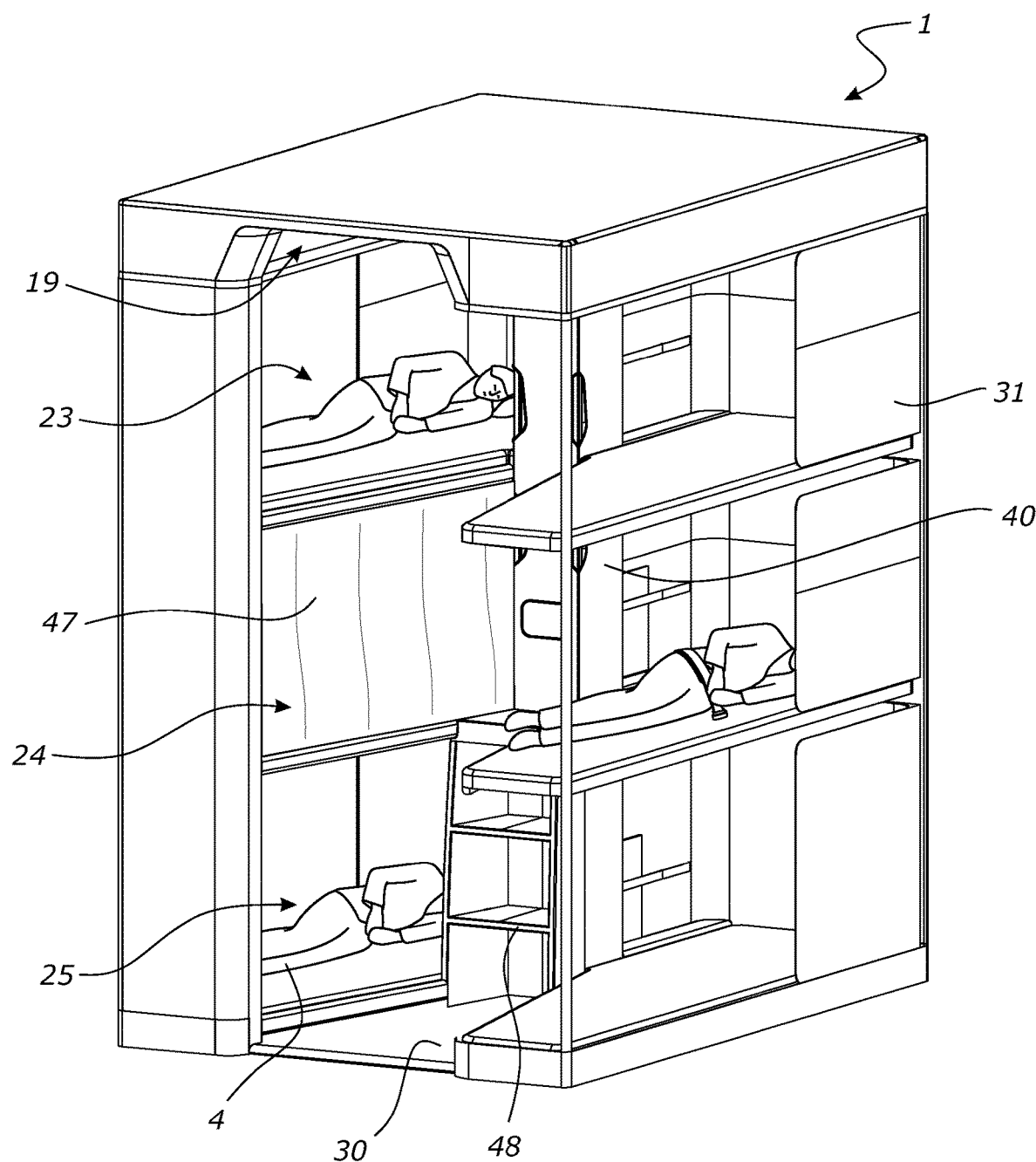
FIG. 2 shows the multi-layer sleeping compartment in use.

Optionally, a curtain, sliding door or other screening 47 may be installed along the side of the sleeping pod 20 as shown in FIG. 2 to improve the privacy and/or separation of sleeping pod passengers from each other.

The central lobby area 30 extends longitudinally into the sleeping compartment 1. In the preferred configurations, the central lobby area 30 extends approximately half-way into the sleeping compartment 1 from the entrance 11. It is anticipated the sleeping compartment 1 the central lobby 30 can be any size but also balances the desire to provide sufficient space for a passengers and crew to stand in the sleeping compartment and/or for passengers to enter the sleeping pods 20 along the side of the pod, while maintaining a limited compartment footprint in the cabin.

Preferably, the sleeping pod 20 has a head region 27 at an end of the sleeping compartment away from the entrance. Preferably, the sleeping pod 20 has a foot region 28 towards the entrance 11.

It is anticipated that having the head region 27 away from the entrance can reduce the disruption to resting passengers in the pods, while other passengers get into the sleeping pod.

Preferably, the widest portion of the sleeping pod 20 is at the head region 27 of the sleeping pod. Having more a more spacious head region 27 may improve the comfort of the passenger and reduce the likelihood of them feeling claustrophobic.

Optionally, the sleeping pod 20 comprises a soft or cushioned wall 31 (as shown in FIG. 2) to improve safety and or comfort for passengers in the sleeping pod. Preferably, the soft wall 31 is located at least at the head end 27 of the sleeping pods.

In the preferred configurations, the central lobby area 30 is approximately trapezoidal or triangular in plan view such that the width of the central lobby area is wider towards the entrance as shown in FIG. 3. A wider area towards the entrance may allow the passenger some space to get ready before climbing into their sleeping pod 30.

Preferably, the entrance 11 is between 50 and 100 cm wide.

More preferably, the entrance 11 is between 60 and 85 cm wide.

Preferably, the sleeping pods 20 narrow towards an entrance end 28 of the sleeping pod 20 such that the width of the sleeping pods are narrower towards the entrance 11 to allow for a wider central lobby area. As the sleeping pods 20 narrow towards the entrance, more space is provided for the central lobby area 30 towards the entrance 11 of the sleeping compartment 1. Preferably narrowing of the sleeping pods 20 is at the less vital foot region 28 of the sleeping pod (the foot region being located towards the entrance end of the sleeping pod). The less vital foot region 28 is reduced, so that there is more space for the central lobby area 30. Preferably, both sides of the sleeping pods 20 narrow towards the entrance 11 to form an approximately V-shape in plan view and to provide an approximately trapezoidal or triangular central lobby area 30.

Preferably, a shorter side of the trapezoid-shaped central lobby area 30 is adjacent the central vertical console.

Preferably, a front side of a central vertical console 40 is adjacent the shorter side of the trapezoid-shaped central lobby area.

In the preferred configurations, the sleeping pods 20 are generally rectangular in plan view except for the narrowing towards the entrance 11, as shown in FIG. 3.

In some configurations, the side of the sleeping pod 20 adjacent the central lobby area 30 in plan view is generally oblique, such that the side of the sleeping pod adjacent the central lobby area tapers away to allow for a wider central lobby area. Preferably, the side of the sleeping pod 20 that is oblique is not parallel to the longitudinal axis of the pod. Preferably, the side of the sleeping pod 20 adjacent the central lobby area tapers such that the sleeping pods having a generally rectangular envelope and a chamfered/cut-out side adjacent the central lobby area 30 to provide a reduced sleeping pod width, preferably in a region where the passenger's foot would rest.

Preferably, the sleeping pods 20 narrow such that the oblique side wall is at an angle between 10° and 20° from the longitudinal axis of the sleeping compartment (angle referenced as 29 in FIG. 3).

Sleeping Compartment Orientation and Location in Aircraft

In the preferred configurations, the sleeping compartment 1 is generally aligned with an aircraft longitudinal axis 6 of the aircraft 2. The sleeping compartment 1 is considered to be generally aligned when the sleeping compartment is fore-and-aft, such that the compartment is orientated lengthwise along the aircraft 2. In these configurations, a sleeping pod passenger would lie generally in line with the longitudinal axis 6 of the aircraft 2, taking into account that a passenger might choose to lie at an angle 'across' the bed surface.

Preferably, the external side walls on the sides of the sleeping compartment 1 is parallel or approximately parallel to the aisle(s) 7 running longitudinally along the aircraft.

Preferably, the front and back external side walls of the sleeping compartment 1 is approximately perpendicular to the aisle(s) 7 running longitudinally along the aircraft.

In the preferred configurations, each sleeping pod 20 is elongate. Preferably, the sleeping pods 20 are arranged longitudinally such that each sleeping pod has a pod longitudinal axis 26 substantially parallel to an aircraft longitudinal axis 6 of the aircraft 2, as shown in the Layout of Passenger Accommodations (LOPA) in FIG. 7. In these configurations, the length L (referenced in FIG. 3) of the sleeping compartments 1 is orientated along the longitudinal direction of the aircraft, which has a longer dimension than the lateral direction of the aircraft.

The longitudinal axis 26 of the sleeping pod 20 preferably runs perpendicular to the front and back ends of the sleeping pod 27, 28. Typically, the direction of the longitudinal axis 26 of the sleeping pod 20 is the same as the external side walls on the sides of the sleeping compartment 1.

In the preferred configurations, the sleeping compartment 1 is located on or towards a centreline 5 of the aircraft body 2. In the most preferred configurations, the sleeping compartment 1 is located along the centreline 5 of the aircraft body, as shown in FIG. 7.

In configurations where the sleeping compartment 1 is located at or towards the centreline 5 of the aircraft body, each sleeping pod 20 may have more space than in other configurations. In contrast, if beds are located on the sides of aircraft, the sidewall of the aircraft can confine the space of one or more sleeping pods as sidewalls of aircraft are generally curved. The space of at least the top pod 23 may need to be reduced and/or is not consistent with the lower pod(s) 24, 25.

Furthermore, the vertical height of an aircraft is generally at its maximum at or towards the centre 5 of the aircraft. In configurations where the sleeping compartment 1 is located at or towards the centreline 5, more layers of sleeping pods may be installed and/or each passenger may have more vertical space in each sleeping pod. For example, at this central location, a sleeping compartment 1 with two, three or four layers of sleeping pods 20 can be installed.

In configurations where the sleeping compartment 1 is located at or towards the centreline 5 of the aircraft body, fewer rows of seats may need to be removed to achieve same density of sleeping pods in comparison to a sleeping compartment located against the aircraft side wall.

In the preferred configurations, the sleeping compartment 1 is located between two aisles 7 in the aircraft, as shown in FIG. 3. Preferably, the sleeping compartment 1 fills up the entire space in the middle section across the aircraft (i.e. it is directly between the aisles, and no seats are in the space between the compartment and the aisles).

The sleeping compartment 1 is located between aisles 7 which run longitudinally along the aircraft, generally used for passengers, crew, luggage etc. to pass. Preferably, the sleeping compartment has a width W, which allows for space and comfort for passengers in the sleeping pods while balancing the need to have adequate aisle space for passengers, hand-luggage, crew and catering equipment to pass through the aisles. In these configurations, passengers can access the entrance 11 of the sleeping compartment 1 from either aisle 7, which improves access to the sleeping pods 20.

In some configurations, the sleeping compartment 1 is positioned such that the entrance 11 is at a cross aisle 8 of the aircraft. A cross aisle 8 is an open space for passengers to pass from one side of the aircraft to the other. Generally, the width of the cross aisle 8 is wider than the space between rows of seats 9 and generally wider than an aisle 7 which runs longitudinally down the aircraft. Furthermore some cross aisles are in line with one (or a pair) of aircraft doors 15.

The sleeping compartment 1 positioned at the cross aisle 8, may provide benefits such as easy access into the sleeping compartment 1 as there is generally more space at the cross aisle. Furthermore, the sleeping commander 1 positioned at the cross aisle 8, may reduce the number of seats 9 which may need to be removed from the centre region of the aircraft (more rows of seats may fit in line longitudinally with the sleeping compartment.)

In the preferred configurations, the sleeping compartment 1 is located adjacent a monument in the longitudinal direction. The sleeping compartment 1 is 'adjacent' a monument, where there is not a row of seats between the sleeping compartment 1 and the monument. In some configurations, the monument is a lavatory 50, as shown in FIG. 7.

In these configurations, the location of the sleeping compartment 1 (being adjacent a monument) may provide particular advantages in the aircraft or other passenger vehicle. As shown in FIG. 7, the entrance 11 of the sleeping compartment 1 faces a side wall of the lavatory 50. Passengers may enter the sleeping compartment 1 without disturbing passengers seated behind the compartment. Introducing a sleeping compartment 1 in an aircraft may increase foot traffic in the area leading to the entrance 11 of the compartment. Generally, extra foot traffic passing by monuments would be preferable over extra foot traffic passing by (especially in front) of passengers in seats 9. It would typically be desirable to minimise foot traffic in front of a row of seats 9, to minimise disturbance to seated passengers in those seats.

Furthermore, in these configurations, where the sleeping compartment 1 is adjacent a monument, the space in the cabin 3 of the aircraft may be efficiently used, as fewer rows of seats along the aircraft may need to be removed to provide space for the sleeping compartment 1.

It is anticipated the sleeping compartment 1 may be oriented either towards the front or rear of the aircraft depending on the desired cabin configuration.

Having the sleeping pods 20 arranged longitudinally, along the centreline of the aircraft 2 and/or being located between two aisles 7 can provide particular advantages over aircraft with traditional passenger accommodation arrangements.

In configurations where the sleeping compartment 1 has one or more of these features, the features work in synergy to provide an efficient compartment footprint in the cabin and/or other advantages.

These features of the sleeping compartment 1 can provide a greater number of sleeping pods 20 within an efficient footprint. As the footprint of the sleeping compartment is efficient, more seats or more sleeping compartments may be installed on the aircraft.

In contrast, if the sleeping pods 20 were arranged horizontally across the aircraft body width extending from the sidewall of the aircraft, the number of layers of sleeping pods would be limited. In typical wide-body aircraft, only two layers of sleeping pods 20 can be provided. If three layers of sleeping pods were installed, the sleeping compartment 1 would have to extend into the aisle 7, therefore requiring the removal of additional centreline seats.

Alternatively, if the sleeping pods 20 were arranged horizontally across the centreline of the aircraft body, the sleeping compartment 1 could extend too far into the aisle 7 and additional outboard seats may need to be removed, in addition to the centreline seats removed.

Furthermore, these features can improve access to the sleeping pods. The location, orientation, and layout of the sleeping compartment 1 can allow side entry into the sleeping pods (shown as arrow S in FIG. 3).

It is anticipated one or more sleeping compartments 1 may be installed on an aircraft. In some configurations, an aircraft may have multiple sleeping compartments 1 located along the aircraft.

Figure 4:
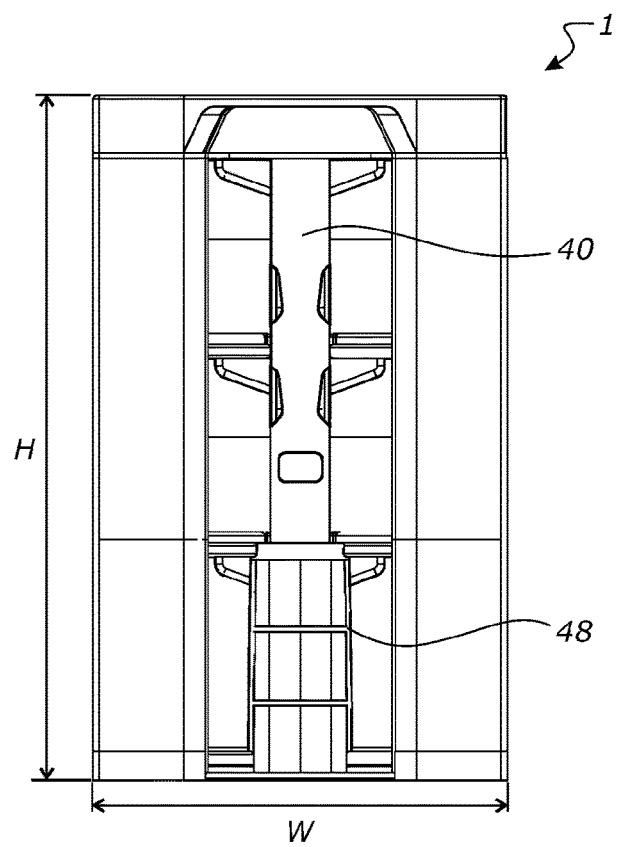
FIG. 4 shows a front view of the multi-layer sleeping compartment.

In the preferred configurations the sleeping compartment is between 210 and 260 cm high (H), as referenced in FIG. 4 (outer dimension).

In the preferred configurations the sleeping compartment is between 120 and 160 cm wide (W), as referenced in FIG. 4 (outer dimension).

In the preferred configurations the sleeping compartment is between 180 and 230 cm long (L), as referenced in FIG. 3 (outer dimension).

Central Vertical Console and Steps

In the preferred configurations, multi-layer sleeping compartment 1 has a central vertical console 40 located between the first side of pods 21 and a second side of pods 22.

Figure 9:
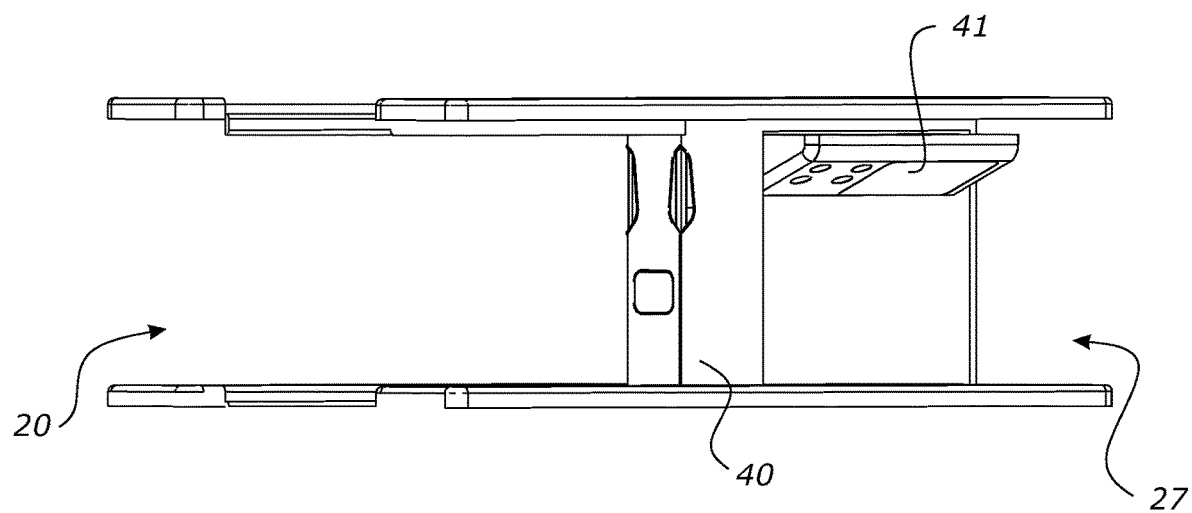
FIG. 9 shows a perspective view of a sleeping pod and a PSU (passenger service unit).

The central vertical console 40 houses one or more services including one or a combination of air conditioning/air gaspers, smoke detector, electrical wiring, ducting, charging port, lights, illuminated signs, crew call button, oxygen mask modules, safety belt (e.g. the connection point of the belt is located on the console), life vests, or other passenger utilities or emergency or safety systems. In some configurations, the central vertical console 40 is provided with a PSU panel 41 (passenger service unit) with electronic interfaces e.g. reading light, crew call button etc. as shown in FIG. 9. Preferably, the PSU is located at towards the head of the passenger, when they are lying on the sleeping pods 20. The central vertical console 40 may also have an IFE screen (In Flight Entertainment), headphone jack, bluetooth or other wireless audio connection, storage, or speakers.

It is anticipated any other services or utilities known to a person skilled in the art may be included in the central vertical console 40.

The central vertical console 40 provides a structure to efficiently use space in the sleeping compartment 1 to store and/or provide the abovementioned services. Housing the wire and/or pipe routing and electrical systems in a central vertical column, rather than running routing inside the external walls or ceiling panel of the pods, can help maximise passenger space in each sleeping pod 20.

Preferably, the central vertical column 40 is hollow to house the utilities and services.

In the preferred configurations, the central vertical column 40 is generally rectangular in plan view. In some configurations, a PSU (passenger service unit) protrudes from the central vertical column 40 such that the unit is above or near the head region of the passenger.

Preferably, the central vertical column 40 extends from the ceiling 19 of the sleeping compartment to the floor.

The central vertical column 40 minimises the complexity of manufacturing and installation of the different utilities and services. Preferably, the central vertical column 40 can house the utilities and services of both the first and second sides of pods of 21, 22 and their different layers of pods.

Furthermore, the central vertical column 40 has a structure which may be easily assembled with other components of the sleeping compartment 1 as shown in FIG. 10.

In some configurations, the central vertical console 40 is located at or towards an end 13 of the sleeping compartment opposite to the entrance 11 (i.e. a back end 13). In other configurations, the central vertical console 40 is located towards the middle of the sleeping compartment.

In some configurations, the central vertical console extends from the back end 13 of the sleeping compartment towards the entrance 11, approximately half way along the compartment.

In the preferred configurations, the central vertical console 40 at least partially forms a barrier or screen between the first and second side of pods 21, 22. Preferably, the central vertical console 40 forms a physical barrier or screen at least between the head regions 27 of the first and second side of pods 21, 22. The central vertical console 40, may act as a sound and visual barrier between passengers in the sleeping pods 20. The physical barrier can also improve the safety of the sleeping pods 20 as it may reduce the likelihood of a passenger from getting too close to the edge of the pod and risk rolling off.

In the preferred configurations, the central vertical console 40 has a width (between the first and second sides) between 15 to 40 cm.

Preferably, the sleeping compartment 1 has steps 48 located between the first side of pods 21 and second side of pods 22 for access to the upper sleeping pods 23. Centralised steps for upper sleeping pods 23 on both sides 21, 22 (rather than separate steps for each side), can increase the space efficiency of the sleeping compartment 1.

In some configurations, the steps 48 are located at or towards an end 13 of the sleeping compartment opposite to the entrance 11. In other configurations, the steps 48 are located towards the middle of the sleeping compartment.

In some configurations, the steps 48 are integrated with the central vertical console 40. The steps 48 may be permanently or removably fixed to the central vertical console 40.

Figures 5, 6:
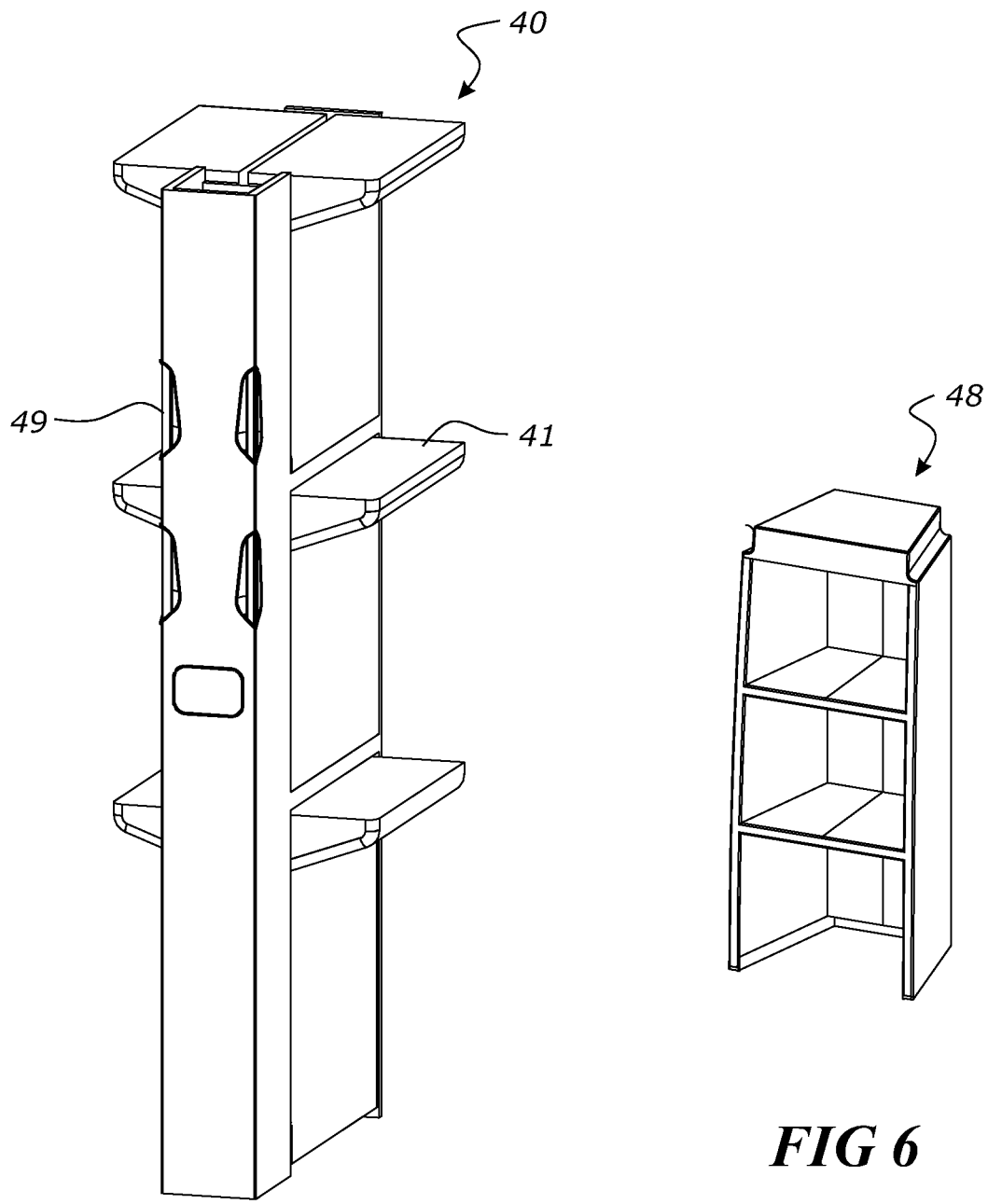
FIG. 5 shows a perspective view of a central vertical console.
FIG. 6 shows a perspective view of steps.

In the preferred configurations, the steps 48 are provided as a staircase or similar as shown in FIG. 6 (i.e. not rungs like a ladder). A staircase or similar structure can provide touchpoints for passengers which are familiar, intuitive and safer to use, especially for passengers using the sleeping pods for the first time. A staircase or similar structure may also be beneficial for passengers with limited mobility, are drowsy and/or disorientated from sleeping, or the cabin lighting may be dimmed.

Space for the centralised staircase may be provided in configurations where there is a central lobby area 30 between the sleeping pods 20.

In some configurations, the steps 48 provide an additional barrier or screen between passengers on at least the lowest layer of sleeping pods 25 as shown in FIG. 2.

It is anticipated that in other configurations, ladders, recessed steps in the central vertical console or other steps may be incorporated into the sleeping compartment 1 as known to a person skilled in the art.

Preferably, the sleeping compartment 1 has one or more handles 49. Handles can assist the passenger when they climb the steps 48 and for entering and existing the sleeping pods 20.

Preferably, the handles 49 are integrated with the central vertical console 40. The handles 49 in some configurations are recessed into the central vertical console 40 as shown in FIG. 5. In other configurations, the handles 49 may be attached to an outer surface of the central vertical console.

In other configurations, the handles 49 are integrated with the sleeping pods 20. For example, in some configurations, the handles 49 are integrated on an underside of the pods. In some configurations, the handles 49 are extended in use, and retracts in a recess (preferably flush with the surface), when not in use, to reduce the risk of head-strike.

It is anticipated, the handles 49 may be integrated in other areas of the sleeping compartment 1, such as the steps 48, ceiling etc.

Ceiling

Figure 8:
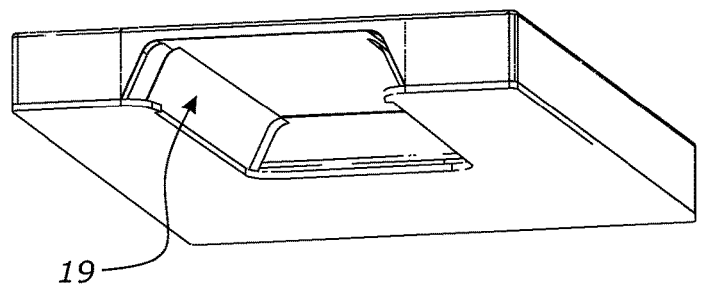
FIG. 8 shows a bottom perspective view of the ceiling of the multi-layer sleeping compartment.

In the preferred configurations, the sleeping compartment 1 has a raised ceiling region 19 raised into an aircraft ceiling (i.e. raised compared to the ceiling of the rest of the aircraft) to provide additional head space as best shown in FIG. 8. The raised ceiling region 19 is preferably at least in an area above the steps 48.

The raised ceiling region 19, providing more headspace and allows passengers to reach the top step 48 and enter the upper sleeping pod 23 safely and comfortably. Preferably, the raised ceiling region 19 has a dome shape recessed into the otherwise flat ceiling of the sleeping compartment 1.

A raised ceiling region 19 may improve the access and ergonomics experience for passengers who may need to be able to extend their head (and upper body) while they are on the top step, so that they can slide into the upper pod safely and more easily (especially for taller passengers). This feature may be particular useful for sleeping compartments 1 with three (or more) layers of sleeping pods where each sleeping pod has a reduced height and the upper sleeping pod 23 is closer to the ceiling.

In comparison, a flat ceiling in a typical aircraft cabin may not provide enough space for a passenger on the top step to enter the upper sleeping pod comfortably, as they may need to contort their body while simultaneously perching on the step, to then slide into the upper sleeping pod.

Preferably, the raised ceiling region 19 is recessed between 10 to 35 cm up into the aircraft ceiling. The raised ceiling region 19 is preferably recessed above a typical monument height e.g. a galley or a lavatory.

More preferably, the raised ceiling region 19 is recessed between 23 to 28 cm up into the aircraft ceiling.

Booking Sessions

It is anticipated, that the sleeping pods 20 may be utilised in a number of ways. For example, the sleeping pods 20 may be booked by passengers for an entire flight, or for part of a flight.

In the preferred booking model, passengers may book the sleeping pods 20 for a session time, much shorter than the total flight time.

Preferably, passengers are in their seats (not in the sleeping pods) for Taxi, Take-off and Landing (TTL). Passengers only move to the sleeping pods 20 after it is safe to do so. This booking model takes into account current regulations relating to TTL. For example, the cruising flight time (excluding TTL) may be divided into multiple sessions which can be booked for a passenger to occupy a sleeping pod.

It is anticipated, in other booking models, the sleeping pods 20 may be booked as their only accommodation (not as an addition to their seat). Minor modifications to the sleeping compartment 1 may be included to satisfy safety and/or other airline regulations.

The preferred book modelling may be dependent on a number of considerations such as the time of flight, scheduled mealtimes, announcement times, and take-off and landing procedures.

Preferably, the sleeping pods 20 can be booked for a block of time. For example, 1 hour, 1.5 hours, 2 hours, 4 hours, 6 hours, 8 hours, 10 hours, 12 hours, 14 hours etc. or an entire flight.

Making multiple sessions available for the sleeping pods 20 may be beneficial as passengers may not want to lie down for the whole flight (especially for ultra-long flights). Multiple sessions allow a greater number of passengers on a flight to benefit from the sleeping pods. Furthermore, a limited session time may reduce the cost for each session for the passengers (as the cost for booking for an entire flight may be prohibitive), and/or increase the profit of airlines. Optionally, passengers may be prevented from booking multiple sessions on the same flight.

Passengers may be woken up at the end of their session by crew, mood-lighting, sound, personal devices, or a combination of the above, so that they can return to their seats and/or to prepare for landing.

For example, a booking model for a 13 to 17 hour flight may have approximately the following timetable:

a) Boarding, take off, ascent,
b) 3×4 hour sleeping pod sessions,
c) Descent, landing.

It is anticipated that the session lengths may be the same or different depending on how the cruising flight time is desired to be divided.

Preferably, a safety briefing is delivered (e.g. by a crew member or in a video) to passengers using the sleeping pods 20, before or at the beginning of their sleeping pod session. Safety checks may be performed by crew regularly to check sleeping pod passengers (e.g. every 30 mins or hour).

In the preferred booking model, sleeping pod passengers are scheduled to enter or exit the sleeping compartment 1 within a specified interval, to minimise disruption to other resting or sleeping passengers in the compartment. For example, the schedules of most or all the sleeping pod passengers in the compartment entering or exiting the sleeping pod could be within an approximately 20 minute, 30 minute or 40 minute window.

In the preferred booking model, the schedule for sleeping pod passengers entering/exiting the sleeping pods 20 is staggered. This can provide the advantage of allowing each passenger to have the space and privacy to prepare and get into/out of their sleeping pod 20, without other sleeping pod passengers trying to do the same. For example, each sleeping pod passenger is scheduled to enter or exit sleeping compartment 1 every 5-10 mins within a specific period (e.g. the passenger enters/exits every 5-10 mins within a 30 minute period.)

It is anticipated that other booking model schedules may be used for the sleeping pods as desired by the airline. Considerations include, but are not limited to, flight time, flight regulations, passenger and/or airline preference.

In some booking models, passengers can pre-book the sleeping pods 20 e.g. on the airline website, mobile app, at the airline check-in counter, through their travel agents etc. Preferably, passengers are able to select their desired session time and desired booking pod location.

In some booking models, passengers may be able to book the sleeping pods 20 as they are on their flight, as desired or needed.

Different pricing may be applied for different sleeping pods 20 (e.g. for the position of the sleeping pod, session time, types of fittings and services provided inside the pod). Airlines may choose to sell session times in the sleeping pods 20 to Premium Economy and Economy passengers, who generally have more compact seats during the flight.

Summary

The multi-layer sleeping compartment 1 can provide sleeping pods 20 for passengers, which would generally otherwise be in more compact economy seats. Compact economy seats generally do not enable passengers to stretch their legs out or lie flat. These sleeping pods provide a more comfortable and more private area for passengers and may be particularly beneficial on long flights and/or overnight flights. Providing these services may improve the experience for passengers and therefore may create a competitive edge for airlines over their competitors.

Features of the multi-layer sleeping compartment 1 in the preferred configurations work in synergy, and can provide one or more of the following advantages:
a) improved comfort and privacy, as the compartment has a housing 10 and an entry 11 at an end of the sleeping compartment (not side);
b) improved accessibility, as entry into the sleeping pods 20 is inside the compartment, and not on the aisle,
c) safer and more natural side entry into the individual sleeping pods, as access is provided by the central lobby area 30,
d) high density of passengers, as the sleeping compartment uses the vertical space in a cabin to efficiently provide multiple sleeping pods in a small area, specific position of the compartment in the cabin, and due to the layout of the compartment, and
e) increasing the numbers of passengers that can use the sleeping pods, by having a booking system with multiple session times during a flight.

To those skilled in the art to which the invention relates, many changes in construction and widely differing embodiments and applications of the invention will suggest themselves without departing from the scope of the invention as defined in the appended claims.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention claimed is:

1. A multi-layer sleeping compartment for an aircraft comprising:
a housing to at least partially isolate the sleeping compartment from an open cabin area of the aircraft;
an entrance to the sleeping compartment, the entrance to the sleeping compartment is located at an end of the sleeping compartment;
a plurality of sleeping pods, the sleeping pods are arranged into a first side of pods and a second side of pods, the plurality of sleeping pods located within the housing; and
each side of sleeping pods has at least a top pod and a lower pod;
wherein the entrance provides access to a central lobby area located between the first side of pods and the second side of pods;
wherein the central lobby area is approximately trapezoidal or triangular in plan view such that the width of the central lobby area is wider towards the entrance;
wherein the sleeping pod has a head region at an end of the sleeping compartment away from the entrance and a foot region towards the entrance;
wherein the central lobby area provides side entry for the sleeping pods on an internal side of the sleeping compartment;
wherein the sleeping compartment is generally aligned with a longitudinal axis of the aircraft; and
wherein the sleeping compartment is located on or towards a centreline of the aircraft body.

2. The multi-layer sleeping compartment as claimed in claim 1 wherein each sleeping pod is elongate and has a pod longitudinal axis substantially parallel to the aircraft longitudinal axis of the aircraft, and wherein the sleeping compartment is located along the centreline of the aircraft body.

3. The multi-layer sleeping compartment as claimed in claim 1 wherein the sleeping compartment is located between two aisles in the aircraft.

4. The multi-layer sleeping compartment as claimed in claim 1 wherein the sleeping pods narrow towards an entrance end of the sleeping pod such that the width of the sleeping pods are narrower towards the entrance to allow for a wider central lobby area.

5. The multi-layer sleeping compartment as claimed in claim 4 wherein the sleeping pods comprises a generally oblique side wall adjacent the central lobby area in plan view such that the side of the sleeping pod adjacent the central lobby area tapers away to allow for a wider central lobby area.

6. The multi-layer sleeping compartment as claimed in claim 5 wherein the sleeping pods narrow such that the oblique side wall is at an angle between 10° and 20° from the longitudinal axis of the sleeping compartment.

7. The multi-layer sleeping compartment as claimed in claim 1 wherein the sleeping compartment is positioned such that the entrance is at a cross aisle of the aircraft.

8. The multi-layer sleeping compartment as claimed in claim 1 wherein the sleeping compartment is positioned adjacent a monument in the aircraft.

9. The multi-layer sleeping compartment as claimed in claim 1 further comprising a central vertical console located between the first side of pods and a second side of pods, and wherein a shorter side of the trapezoid shaped central lobby area is adjacent the central vertical console.

10. The multi-layer sleeping compartment as claimed in claim 9 wherein the central vertical console houses one or more services including one or a combination of:
 a) Air conditioning/air gaspers,
 b) Smoke detector,
 c) Electrical wiring,
 d) Ducting,
 e) Charging port,
 f) Lights,
 g) Illuminated signs,
 h) Crew call button,
 i) Oxygen mask modules,
 j) Safety belt,
 k) Life vests,
 l) PSU (Passenger Service Unit),
 m) IFE screen (In Flight Entertainment),
 n) Headphone jack,
 o) Bluetooth or other wireless audio connection,
 p) Storage,
 q) Speakers.

11. The multi-layer sleeping compartment as claimed in claim 9 wherein the central vertical console is located at or towards an end of the sleeping compartment opposite to the entrance.

12. The multi-layer sleeping compartment as claimed in claim 9 wherein the central vertical console at least partially forms a barrier or screen between the first and second side of pods.

13. The multi-layer sleeping compartment as claimed in claim 9 further comprising steps located between the first side of pods and second side of pods for access to the upper sleeping pods, and wherein the steps are located at or towards an end of the sleeping compartment opposite to the entrance.

14. The multi-layer sleeping compartment as claimed in claim 9 wherein the steps are integrated with the central vertical console.

15. The multi-layer sleeping compartment as claimed in claim 13 further comprising a raised ceiling region raised into an aircraft ceiling to provide additional head space, the raised ceiling region being at least in an area above the steps.

16. The multi-layer sleeping compartment as claimed in claim 1 wherein each sleeping pod comprises a permanent flat bed surface.

17. The multi-layer sleeping compartment as claimed in claim 1 wherein one or both sides of sleeping pods have one or two intermediate sleeping pods between the upper sleeping pod and lower sleeping pod.

18. A method of travel on an aircraft wherein, a session in a multilayer sleeping compartment according to claim 1 is booked for a session for at least 1 passenger.

19. The method of travel of claim 18, wherein the session is during a cruising flight time, said cruising flight time excluding taxi, take off and landing.

20. The method of travel of claim 19, wherein a cruising flight time is divided into multiple sessions.

* * * * *